United States Patent [19]
Goto

[11] Patent Number: 5,091,225
[45] Date of Patent: Feb. 25, 1992

[54] MAGNETIC DISC MEMBER AND PROCESS FOR MANUFACTURING THE SAME

[75] Inventor: Fumio Goto, Tokyo, Japan

[73] Assignee: NEC Corporation, Japan

[21] Appl. No.: 397,583

[22] Filed: Aug. 23, 1989

[30] Foreign Application Priority Data

Aug. 24, 1988 [JP] Japan ................................ 63-211225

[51] Int. Cl.[5] ............................................. B05D 1/18
[52] U.S. Cl. .................................. 427/430.1; 427/131; 427/205; 427/435; 427/436
[58] Field of Search ............... 428/141, 143, 694, 695, 428/600; 427/131, 430.1, 435, 436, 205

[56] References Cited

U.S. PATENT DOCUMENTS

| | | | |
|---|---|---|---|
| 4,778,707 | 10/1988 | Arioka et al. | 428/141 |
| 4,828,899 | 5/1989 | Arioka et al. | 428/143 |
| 4,835,032 | 5/1989 | Arioka et al. | 428/900 |
| 4,959,273 | 9/1990 | Hamamura et al. | 428/900 |

*Primary Examiner*—Paul J. Thibodeau
*Attorney, Agent, or Firm*—Laff, Whitesel, Conte & Saret

[57] ABSTRACT

An improved magnetic disc member for use in a magnetic disc device, said member comprising a base plate, a number of fine noble metal particles adhered to a surface thereof to form microprotuberances and a nonmagnetic layer coated further thereon; the surface roughness of the member being controlled by changing a thickness of the nonmagnetic layer.

8 Claims, 1 Drawing Sheet

FIG. 1

MAGNETIC DISC MEMBER AND PROCESS FOR MANUFACTURING THE SAME

BACKGROUND OF THE INVENTION

1. Field of the Invention

This invention relates to magnetic disc members for use in magnetic disc devices which are a kind of a magnetic recording device; and it also relates to a process for manufacturing the same.

2. Description of the Prior Art

In recent years, a magnetic disc device in a file memory has risen in importance and its recording density has been remarkably improved year by year. Until now, as for a magnetic recording medium, there has been broadly used a so-called coating-type disc which was obtained by coating a mixture of iron oxide magnetic powders and an organic resin binder on a base plate and thereafter polishing the coating. In the coating-type disc, a lubricant can be incorporated in the kneaded layer of the magnetic powder and the organic resin binder. In addition, a magnetic layer is not less than 0.5 $\mu$m in thickness and the surface roughness $R_{max}$ is relatively large and is about 0.05 $\mu$m which correspond to about 10% of a thickness of the magnetic layer ($R_a$ is about 0.0 $\mu$m corresponding to only a fraction of $R_{max}$). Thus, a lubricating film having enough thickness can be applied with no adsorption (stick) to a magnetic head and duarability to a contact and slide with the head is good. However, in order to attain the higher recording density, it is necessary to thin the magnetic recording layer. The coating-type disc is disadvantageous in that respect.

Thus, a thin film magnetic disc has began to be used as the high density recording medium. The magnetic recording layer is composed of a magnetic thin film formed by a plating process, a sputtering process, a depositing process or the like.

As for the magnetic disc member in the thin film magnetic disc, an aluminum alloy member or the like has been used heretofore. Ni alloy plating film is formed on a base plate which is followed by polishing the resulting surface. Generally, the member which is obtained by forming the Ni alloy plating film has a thickness of a few $\mu$m to several tens $\mu$m on the aluminum alloy base plate. Thereafter, a mirror-polishing is given to the surface of the film to a surface roughness $R_a$ of not more than about 0.04 $\mu$m according to an abrading process such as a lapping or polishing process or the like (The Research Institute of Electrical Communication, practical Reports on Research 26-2, p.471, 1977).

However, in case of forming the magnetic thin film on the above member, there is a problem because a very small amount of a lubicant can only be retained at the surface of a magnetic disc and thus a CSS (Contact Start Stop) durability of the magnetic head is bad, since the magnetic thin film having a thickness of only a fraction of that of the magnetic recording layer in the coating-type disc is generally smooth and uniform. Thus there is no retention place for the lubricant at the surface of the magnetic disc. In addition, in the case that a liquid lubricant was coated on the mirror-polished surface of the magnetic disc, there was a defect because adsorption was caused between the lubricant coating and a magnetic head slide having a smooth surface and thus damage was easily caused when the disc started.

Therefore, there is a process wherein fine textures in the form of concentric circles are formed by contacting a tape including abrasive grains while rotating the Ni alloy plated member having the mirror-polished surface as mentioned above and a process for increasing the surface roughness wherein the Ni alloy plated member is once mirror-polished with fine abrasive grains and thereafter is polished with coarse abrasive grains.

However, in the process wherein the coarse surface is formed by means of the above machining techniques, heavy polished textures may cause signal errors because there are relatively large grains in the abrasive grains, foreign matters included therein when abraded or the like. It is difficult to obtain roughened surface which is uniform and suitable over the entire area of the disc. There is a problem that this non-uniformly polished textures have an influence upon the characteristics of the magnetic layer and thus that deterioration of the recording and reproducing characteristics such as resolution, S/N and the like. The servosignal quality deteriorates. Furthermore, in the machining techniques, it is impossible to control strictly the surface roughness. It is difficult to increase the density of the abrasive texture, since the obtained surface roughness is practically determined by the size of the abrasive graine used. Therefore, in order to prevent adsorption to the head and to give the lubricating film having a sufficient thickness, it is necessary to make the surface roughness fairly large. Thus there is a problem that deterioration of electromagnetic conversion characteristics is caused. In addition, the above precise machining has difficulty in a package mass production and has a problem in productivity.

SUMMARY OF THE INVENTION

An object of the present invention is to provide a magnetic disc member for obtaining a magnetic disc which causes no increase in signal error and no deterioration of recording and reproducing characteristics such as resolution, S/N and the like and of servo-signal quality, and which has a superior durability due to prevention of an adsorption (stick) to a magnetic head.

An further object of the present invention is to provide a process for manufacturing the above magnetic disc member.

The magnetic disc member according to the present invention comprise a base plate, a number of fine metal particles selected from the group consisting of noble metal and copper particles adhered to a surface of the base plate and a nonmagnetic layer which coated thereon.

A basic process for manufacturing the magnetic disc member according to the present invention comprises forming microprotuberances by allowing a number of fine noble metal particles to adhere on the base plate and coating a nonmagnetic layer further thereon. A surface roughness of the member is controlled by changing a thickness of said nonmagnetic layer.

BRIEF DESCRIPTION OF THE DRAWING

By way of example of the many features and advantages of the present invention, an illustrative embodiment in the magnetic disc member is described below and shown in the accompanying drawing, in which the FIGURE shows a diagrammatic sectional view of a magnetic disc member according to the present invention.

DETAILED DESCRIPTION OF THE PREFERRED EMBODIMENT

Figure 1:
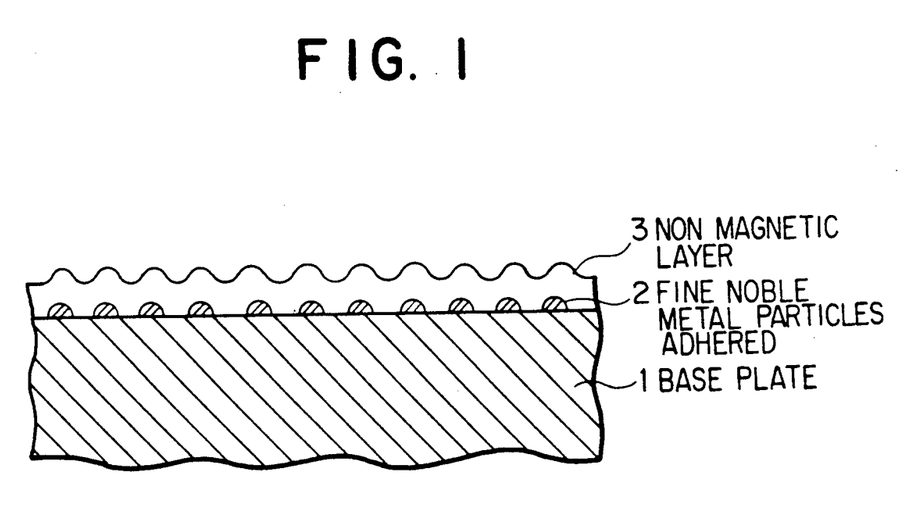

The FIGURE shows a basic structure of a magnetic disc member according to the present invention. In the drawings, reference number 1 indicates a base plate, reference number 2 indicates fine particles adhered and reference number 3 indicates a nonmagnetic layer.

The surface roughness (especially, height, size, shape, density of microprotuberances at the surface) of the magnetic disc in which the magnetic disc member according to the present invention is used, depend upon conditions under which the magnetic disc is used, respectively. The conditions such as the height, shape and the like of the microprotuberances, are selected for preventing the adsorption to the magnetic head and for obtaining the magnetic disc having superior durability these conditions are selected depending on the head disc conditions such as a kind, structure and material of the head, a floating amount of the head, a kind and thickness of a lubricant film and a protecting film and the like.

According to the present invention, the following matters have been found. It is desired that the height of the microprotuberance is less than the floating amount of the head in order to avoid an impact between the disc and the head and is more than the thickness of the lubricant film in order to avoid adhesion (adsorption) between the head and the disc. The floating distance of the head is set generally at not more than 0.6 $\mu$m, in a recent disc device at not more than 0.3 $\mu$m and in a high density disc device at not more than 0.2 $\mu$m. The thickness of the lubricant film is selected between several Å of a monomolecular layer in case of a thin film and tens or hundreds Å in case of a thick film, as the case may be.

In order to prevent adsorption to the magnetic head and to improve the durability, the height of the microprotuberance is used between several Å and 0.6 $\mu$m, preferably between ten-odd Å and 0.2 $\mu$m. In consideration of some conditions in a present high density disc device (linear density of not less than twenty thousand BRI, Bit Per Inch), it has been found that the height is preferably selected between tens Å and 0.1 $\mu$m.

The size of the microprotuberance varies depending on the tolerance of recording and reproducing characteristics on which it has an effect but the smaller size is preferred to retain good characteristics.

At the present time, the surface of the member is roughened by a mechanical polishing. The diameter of abrasive grains to be used is mostly between several microns and 0.8 $\mu$m. The shape of the abrasive grains is reflected in the processed surface. Thus, in case the surface was roughened by the polishing, it is frequent to allow the recording and reproducing characteristics to deteriorate. However, in case the microprotuberances are formed on the surface, it has become apparent that, due to a formation of the microprotuberances having a size of not more than 0.7 $\mu$m, preferably not more than 0.4 $\mu$m, the surface has almost no effect on the recording and reproducing characteristics.

In order to prevent adsorption to the magnetic head and to improve the durability, the higher microprotuberances are preferable. However, even if the height of the microprotuberance is relatively small, a remarkable effect is exerted if the density of the microprotuberance is high. The higher the density of the microprotuberance is, the better the durability becomes. Concretely, there is a remarkable effect on the prevention of adsorption to the magnetic head and the durability was improved. If the microprotuberance density is not less than one per 10 $\mu m^2$, and preferably not less than one per 5 $\mu m^2$; if the height is not less than 0.1 $\mu$m and the density is not less than one per 5 $\mu m^2$, and preferably not less than one per 3 $\mu m^2$, and if the height is not less than 0.1 $\mu$m. The required height, shape, density, i.e. the surface roughness, of the above microprotuberance at the surface of the nonmagnetic layer may change by the magnetic layer, the protective layer and the like which are formed on the magnetic disc member. The surface roughness is varied according to such change and along the above purpose.

As for the base plate to be used in the magnetic disc member of the present invention, there are a base plate itself and a base plate on which several additive films are coated, for example, a base plate on which an underlying thick film is coated, which may be followed by coating additionally an underlying thin film thereon. The base plate is generally a metal such as aluminum alloy, copper, bronze . . . phosphor bronze, iron, titanium or the like. The base plate can also include the above metal base plates the surface of which was subjected to an oxidation treatment or a chromate treatment, and a nonmetallic base plate, such as glass, ceramics, resin or the like, which was subjected to a suitable activation treatment, and a base plate composed of a composite material thereof. The thick underlying film and thin underlying film, it is preferably an electroless plating film of NiP or NiB. It is also possible to use an electroplating film and a dry plating film according to a sputtering process or a deposition process. In addition, the NiP or NiB film may contain at least one element selected from Mn, Fe, Co, Al, Ta, Li, Mg, Ti, V, Cr, Cu, Zn, Ge, Y, Zr, Nb, Mo, Ru, Rh, Pd, Ag, Au, Sn, Sb, Te, Cs, W, Re, Pb, Bi, La, Ce, Pr, Nd, Ac, Ba, Pt, Sm and the like, and may contain in addition to the above element at least one nonmetal selected from P, B, C, N, O, S, As, Na, K, F, Cl, Br, I, Ca and the like.

Moreover, the thick underlying film and the thin underlying film are not limited to the Ni alloy film. They may be a film comprising at least one element selected from W, Mo, Cu, Sn, Zn, Re, Mn, Fe, Cr, Co, Au, Ag, Al, Ta, Ti, V, Si and the like and may contain in addition to the above element at least one nonmetal selected from P, B, C, N, O, S, As, Na, K, F, Cl, Br, I, Ca and the like. In addition, the thick underlying film and the thin underlying film do not need be a monolayer, respectively. These films may be a multilayer comprising metal layer or several alloy films therewith. After a film having a thickness of generally about 1–50 $\mu$m, preferably about 10–30 $\mu$m was formed, the thick underlying film is polished in order to obtain a smooth surface. The thickness of the thin underlying film is generally less than that of the thick underlying film. The thin underlying film is formed with controlled characteristics of a magnetic film which is formed thereon and removing an effect of the base plate on the magnetic film.

The fine particles which are used in the magnetic disc member, according to the present invention is preferably the fine particle of a noble metal and are selected from the group consisting of noble metal and copper particles which are large numbers, for example, according to a process as set forth below. As for a treatment for adhering the fine particles, a preferred process comprises immersing the base plate in a treating solution in which a salt of a noble metal such as palladium, gold, silver or the like is mainly dissolved and allowing the noble metal particles to adhere to the base plate. However, the noble metal, such as palladium, gold, silver, platinum, rhodium, ruthenium, as well as copper or the like, may be adhered to the base plate according to a wet or dry plating process, i.e. a treatment process such as an electroless plating, electroplating, sputtering, deposition, ion-plating, cluster ion beam depositing or the like.

There are many cases that the magnetic disc is composed of a multi-layer structure, from the member to the protective film and the lubricating film, which contains a metal (base metal) having an ionization tendency higher than that of the above noble metal. Therefor, the roughened state due to the microprotuberance of the noble metal is stable. Thus, there is less possibility for liquidating or deteriorating the noble metal due to the subsequent film formation. In addition, as these noble metals are nonmagnetic, they have almost no effect on the recording and reproducing characteristics of the magnetic medium. For that reason, the noble metal was selected but it is also possible to use a metal and alloy which have a lower ionization tendency and lower magnetization than those of each the layers of which the magnetic disc is composed.

As for the treatment for adhering the fine particles of the noble metal by using the treating solution, it is possible to use an activation treatment which is a pretreatment for a plastic plating or the like. This treatment includes a two-stage activation treatment comprising a sensitization treatment with a tin chloride solution and an activation treatment with a palladium chloride solution, being carried out in an acidic region. A one-stage activation treatment comprises an acceleration treatment in which a tin/palladium colloidal catalyst solution and an acid alkali solution are used and which is carried out in an acidic region. A one-stage activation treatment uses a tin/palladium complex catalyst solution and which is carried out in an alkaline region. An activation treatment can be carried out with a solution of a noble metal salt which in all cases of an acidic, alkaline and neutral region.

The two-stage treatment, which has been broadly carried out until now, comprises steps of a sensitization treatment with a sensitizer solution comprising a $SnCl_2$ solution. A subsequent activation treatment uses an activator solution containing a noble metal ion such as Pd, Au, Ag or the like, as shown in U.S. Pat. No. 2,702,253, whereby fine particles of Pd, Au, Ag or the like which acts as a catalyst for a plating reaction are adhered to the surface of the base plate, By way of example of the treating solution, it is possible to use a sensitizer solution such as Narcus Solution (acidic): $SnCl_2$ 10 g/l, HCl 40 g/l,
Narcus Solution (alkaline): $SnCl_2$ 100 g/l, Rochelle salt 175 g/l, NaOH 150 g/l,
Weiss Solution $SnSO_4$ 25–40 g/l, $H_2SO_4$ 5°ml/l, alcohol 150–250 ml/l, quinol 5–15 ml/l, water 600–1000 ml/l,
Walker Solution: $SnCl_2$ 90 g/l, HCl 155 ml/l, or the like
and an activator solution such as
Pd Treating Solution (1): $PdCl_2$ 2 g/l, HCl 20 ml/l,
Pd Treating Solution (2): $PdCl_2$ 0.15–0.25 g/l, HCl 2.5 ml/l,
Au Treating Solution: chlorauric acid 1 g/l, HCl 2 ml/l,
Ag Treating Solution: silver nitrate 1.5 g/l, ammonia 1.2 ml/l, or the like, as described in "Lecture On A Metallic Surface Technique, No. 9, Electroless Plating", by T. Ishibashi, Asakura Shoten 1969. Moreover, by way of example of the solution on the market, it is possible to use "Pink Shoemer" (a sensitizer solution) and "Red Shoemer" (an activater solution) which are manufactured by Nihon Kanizen Co. Ltd., and the like.

In recent years, a one-stage treatment, which comprises a catalyzing treatment with a solution of tin/palladium colloidal catalyst and an acceleration treatment with a solution of acid or alkali, has been carried out as a uniformer catalyzing process, as shown in U.S. Pat. No. Nos. 3011920, 3532518 and 3650913. As an example of the composition of the treating solution, it is possible to use the following solution:

Catalyst Solution

"A" Solution: a colloidal solution which was prepared by adding HCl 60 ml/l, water, $PdCl_2$ 1 g and $SnCl_2 \cdot 2H_2O$ 22 g in order and then adding water to 1000 ml, "B" Solution: a colloidal solution which was prepared by adding HCl 60 ml/l, water, $PdCl_2$ 0.25 g and $SnCl_2 \cdot 2H_2O$ 12 g in order and then adding water to 1000 ml, "C" Solution: a colloidal solution which as prepared by adding HCl 300 ml, water, $PdCl_2$ 1 g, $Na_2SnO_3$ 1.5 g and $SnCl_2 \cdot 2H_2O$ 37.5 g in order, "D" Solution: a colloidal solution which was prepared by adding HCl 320 ml, water, $PdCl_2$ 1 g and $SnCl_2 \cdot 2H_2O$ 4 g in order, aging the obtained mixture for one day and thereafter adding $SnCl_2 \cdot 2H_2O$ 46 g, and the like, as described by T. Osaka et al. in "J. Electrochemical Society", Vol. 127, No. 5, p.1021, 1980, and as the solution on the market, "E" Solution: a hydrochloric acid based colloidal solution HS101B which is manufactured by Hitachi Chemical Co. Ltd., "F" Solution: a hydrochloric acid based colloidal solution "Cataposit 44" which is manufactured by Shiplay Far East Co. Ltd., and the like.

Acceleration Solution

"G" Solution: NaOH 1 mol/l,
"H" Solution: HCl 6 mol/l,
"I" Solution: $H_2SO_4$ 1.12 mol/l,
"J" Solution: ammonia 1 mol/l,
"K" Solution: $NH_4BF_4$ 1 mol/l, and the like, as described by T. Osaka et al. in "J. of Electrochemical Society", Vol. 127, No. 11, p.2343, 1980, and as the solution on the market, "L" Solution: "ADP201" by Hitachi Chemical Co. Ltd., "M" Solution: "Accelerator 19" by Shiplay Far East Co. Ltd.

Moreover, in recent years, the tin/palladium complex catalyst solution has been used under an alkaline region. As a solution on the market, there is "Activator Neongunt 834" by Shearing Co. Ltd.

As for the treatment for roughening the surface with the solution of the noble metal salt under the alkaline or neutral region, it is possible to use the Pd treating solution (1), Pd treating solution (2), Au treating solution, Ag treating solution and the like which are above referred to as the activater solution. A concentration of $PdCl_2$ is used within a range of 0.0001–50 g/l, preferably 0.005–15 g/l, chlorauric acid is used within a range of 0.001–30 g/l, preferably 0.1–10 g/l of silver nitrate is used within a range of 0.001-35 g/l, preferably 0.1-15 g/l. The concentration to be used is within a range of 0.001-500 ml/l and preferably 0.1-100 ml/l. The concentration of ammonia is within a range of 0.005-600 ml/l, preferably 0.1-150 ml/l.

As for the noble metal, in addition to Au, Ag, Pd, it is also possible to use an element such as Pt, Rh, Ru, Re or the like. As for the noble metal salt, in addition to chloride, it is also possible to use a sulfate, a nitrate, a salt of organic acid and the like. As for an acid, in addition to a hydrochloric acid, it is also possible to use a sulfuric acid, nitric acid, organic acid and the like. In addition to the above materials, there may be added additives such as pH buffers, an organic acid (e.g. a succinic acid, an acetic acid or the like) which has an action of a complexing agent, a surface-active agent or the like.

As for the commercially available solution, the acidic solution includes Activation Solution 1 which was manufactured by Nihon Kanizen Co. Ltd. and alkaline solution includes Activation Solution 2 and 3 by the same maker. The above treatment is carried out at a temperature range of 0°-95° C., preferably 15°-80° C., for an immersion time within the range of one second to 100 minutes, preferably 5 seconds to 15 minutes.

The treatment is often carried out generally at a pH of not more than one in the HCl acidity. In some cases it is carried out under alkaline conditions of a pH not less than 14 or at a pH range between 1 and 14. The pH of the treating solution is not particularly subject to limit.

The above treatment does not always cause the adhesion of the fine particles of the noble metals which results in the formation of the microprotuberances, which is the object of the present invention. The state of the surface which is subjected to this treatment is important in order to attain the above object and thus it is desirable to modify the surface as a pretreatment.

A conditioning treatment for modifying the surface, uses acid treatment and an alkali treatment. If a subsequent treatment for roughening the surface is carried out under acid conditions, the acid treatment is used. If it is carried out under alkali conditions, the alkali treatment is used. Conditions for the conditioning treatment, may be a kind of acids (such as a hydrochloric acid, a sulfuric acid, a nitric acid, an organic acid and the like) and may be alkalis (such as ammonia, caustic soda and the like). The concentration thereof, the immersion time, and the like are selected according to the required shape of the fine noble metal particles, the surface roughness and the treatment which is used to adhere the fine noble metal particles.

The state and composition of the magnetic disc surface obtained can be examined with a transmission type electron microscope, a secondary electron beam microscope, a surface roughness tester, an analytical electron microscope, a scanning type Auger electron analyzer, a X-ray microanalyzer or the like. By the wet or dry treatment as mentioned above, it is possible to form the fine noble metal particles of which the main component is at least one noble metal selected from palladium, gold, silver, platinum, rhodium, ruthenium and cooper. The fine noble metal particles may contain at least one selected from Cl, C and O within limits which are not prejudiciary to the effect of the present invention. The fine noble metal particles may further contain at least one element selected from Mn, Fe, Co, Al, Ta, Li, Mg, Ti, V, Cr, Zn, Ge, Y, Zr, Nb, Mo, Sn, Sb, Te, Cs, W, Pb, Bi, La, Ce, Pr, Nd, Ac, Ba, Pt and Sm. In addition to the above element, the particles may contain at least one nonmetal selected from P, B, N, S, As, Na, K, F, Br, I and Ca, within limits which are not prejudicial to the effect of the present invention.

The fine noble metal particles adhere to the surface of the base plate and form the microprotuberances. The microprotuberance thus formed contour the microprotuberance at the surface of the nonmagnetic layer which is coated thereon. It was possible to form the microprotuberances at the surface of the base plate which meet the above-mentioned requirements, such as the height, size, shape, density and the like, of the microprotuberances at the surfaces of the nonmagnetic layer.

As for the nonmagnetic layer which is used in the magnetic disc member of the present invention, it is possible to use the same as thick underlying film and thin underlying film as mentioned above. Its composition, configuration, construction and structure are as mentioned above. It has been found that, by increasing the thickness of the nonmagnetic layer, the height and size of the microprotuberance of the fine noble metal particles increase. The shape changes but the density does not almost change. Therefore, it has become apparent that the surface roughness can be controlled by changing the nonmagnetic layer thickness.

The magnetic layer, protective layer and lubricating layer are formed in turn on the magnetic disc member of the present invention to make the magnetic disc. The magnetic layer which is formed on the magnetic disc member is a magnetic film containing at least Co, Ni, Fe, and may be an alloy film further containing an adding element such as P, B or the like, and may be an oxide film containing oxygen and a nitride film containing nitrogen. The other added element which is contained in the magnetic film does not need to be particularly limited. The magnetic film may contain at least one element selected from Re, Mn, W, Li, Be, Mg, Al, Ru, Si, Mo, Zn, Sr, Y, Zr, Nb, Cd, In, Sb, Ta, Ir, Hg, Tl, Ti, V, Cr, Cu, Ga, Ge, Tc, Rb, Ra, Hf, Rh, Pd, Ag, Au, Pt, Sn, Te, Ba, Cs, Os, Sc, Se, Pb, Bi and lanthanide series rare earth elements.

The magnetic film may contain in addition to the above elements at least one nonmetal selected from C, S, As, Na, K, F, Cl, Br, I, Ca and the like. The magnetic film contains Co, Ni and Fe of not less than 10%, preferably not less than 50%. It contains P and B of about 30% maximum, preferably of not more than 15%. The thickness of the magnetic film to be used is within a range of 0.003-3 μm. The thickness of the magnetic film for a high density recording is preferably not more than 0.5 μm. The magnetic layer is used with one or more layers.

If the magnetic layer is composed of two or more layers, the magnetic films which are identical with one another or differ in the composition and magnetic characteristics are laminated directly or through a nonmagnetic film. These films are formed by the wet plating process such as an electroless plating or electroplating process or the like, or the dry plating process such as a sputtering, depositing or ionplating process or the like. Generally, these films are referred to as a thin film medium, and are used in a plating disc, metal sputtering disc, ferrite sputtering disc, depositing disc and the like.

As for the protective layer, a thin protective film or a protective layer is obtained by forming several additional films below and/or on the thin protective film.

For example, the layer is obtained by coating a thin protective film on a thin overlying film, which may be followed by further coating a lubricating film thereon, or which is obtained by coating an additional film on a thin overlying film and further coating a thin protective film thereon which may be followed by coating a lubricating film thereon. These films may be one layer or multi-layer, respectively.

As for the thin protective film, it is preferable to use a film of an amorphous semimetal oxide, which is generally referred to as a glassy material, such as quartz glass, silicate glass, phosphate glass, amorphous alumina or the like; a film of an amorphous inorganic oxide such as polysilicic acid which is a condensation product of tetrahydroxysilance; and a carbon film. However, in some case it is possible to use a film of a silicon compound such as $Si_3N_4$ or the like, of a metal such as Rh, Ag or the like, of a Co oxide or a CoNi oxide, or the like.

These films are conveniently formed by the following processes: a dry plating process such as a sputtering, depositing, plasma CVD, plasma injection CVD or ion plating process or the like; a wet plating process such as an electroless plating or electroplating process or the like; a coating process; an oxidation treatment in a solution; a thermal oxidation process and the like.

As for the thin overlying film, it is preferable to use a thin film of a Ni alloy, chromium compound, zirconium compound or the like. It is also preferable to use the same material as that of the above-mentioned thick underlying film and thin underlying film. A nonpolar solid lubricant, polar solid lubricant, liquid lubricant or the like is used as the lubricating film (The 46th Applied Magnetic Society, Research Materials, 46-5, 1986).

Moreover, there are several variations on the construction of the magnetic disc. By way of example, there is a magnetic disc wherein a pretreatment layer comprising chromium, molybdenum, titanium, silicon, gold or the like is formed below the magnetic layer for the purpose of controlling the magnetic characteristics and crystal structure of the magnetic recording layer and making it easy to manufacture the recording layer. The magnetic recording layer is multilayered directly or through the nonmagnetic layer for the purpose of improving the magnetic recording characteristics and multiplexing data information and servo information. The protective film is multilayered for the purpose of attaining a better weathering resistance.

In the magnetic disc wherein the magnetic thin film is used as a medium for the high density magnetic recording body, there was a problem because the surface of the magnetic disc causes a bad CSS durability in the magnetic head because the surface is smooth. Thus, there is no retention place for the lubricant. There is an increase of an amount of the lubricant which causes adsorption between the surface and a sliding surface of the magnetic head. Thus, it is broadly carried out to form lines, which are called "texture", on the smooth surface of the disc member by a machining process. However, in a process for forming a rough surface by such machining process, signal errors were easily caused due to a non-uniformity of the abraded surface. In addition, it was difficult to increase the density of the abraded texture because the surface roughness cannot be finely controlled.

In order to prevent the adsorption (stick) of the head and to give the lubricating film having a sufficient thickness, it is necessary to make the surface roughness considerably greater. Thus, there was a problem which caused a lowering in electromagnetic conversion (read/write) characteristics. An effect of the roughness and shape of the disc surface on the head adsorption, durability, electromagnetic conversion characteristics and the like was examined in detail.

As a result, it has become apparent that the shape of the surface obtained by a process which comprises allowing the fine particles to adhere by a physical or chemical surface treatment is finer and denser than that obtained by a machining process. The control of the former treatment is easy. The microprotuberance (convex) due to the fine particles which are formed by the physical or chemical surface treatment is particularly greater in an effect for preventing the head adsorption than the abrasive textures (concave) formed by the machining process.

It has become apparent that, since the microprotuberance due to the physical or chemical surface treatment can be finely and densely formed, a little surface roughness is enough. Thus, a good result is obtained also on the durability, electromagnetic conversion characteristics and the like. The height, shape and the like of the microprotuberance which are required to prevent the adsorption to the magnetic head and obtain the magnetic recording medium having good durability, are selected according to the head disc conditions.

An effect of an amount of the microprotuberance (the microprotuberance density) was more remarkable than that of the height of the microprotuberance. One novel and important role of the nonmagnetic layer which is coated on the fine particles is played in a protection of the adhered fine particles. In addition, it is particularly important to control the microprotuberance into the required shape. It has become apparent that the surface roughness can be easily controlled by changing a thickness of the nonmagnetic layer. The present invention has been brought about by the above knowledgement and information.

As shown in the following Examples and Comparative Examples, according to the present invention, the magnetic disc member is composed of a number of fine noble metal particles which were adhered onto the surface of the base plate. The nonmagnetic layer was further coated thereon. As a result, a number of microprotuberances are formed on the surface. The surface roughness can be controlled by changing the thickness of the above nonmagnetic layer. Thus, the magnetic disc, in which the adsorption to the magnetic head is prevented, and having a good durability, is obtained without damaging the recording and reproducing characteristics (i.e. without causing an increase in signal errors and a decrease in S/N).

Hereinafter, the magnetic disc member according to the present invention and a process for making the same are described in more detail with reference to the following examples.

EXAMPLE 1

After the surface of an alumina ceramics base plate (100mm in inner diameter and 210mm in outer diameter) which has sufficient hard and good surface precision (Ra 0.001 μm, TIR≦20 μm, acceleration of gravity≦2G) was subjected to a washing and conditioning treatment, the obtained surface was subjected to a treatment for adhering fine particles of a noble metal under the following conditions.

Treatment for Adhering Fine Noble Metal Particles (1)

The base plate was immersed in a sencitizer solution ($SnCl_2$ 12 g/l, HCl 40 ml/l) at 30° C. for one minute and thereafter immersed in an activator solution ($PdCl_2$ 0.15 g/l, HCl 15 ml/l) at 40° C. for two minutes.

Treatment for Adhering Fine Noble Metal Particles (2)

The base plate was immersed in a sencitizer solution ($SnCl_2$ 6 g/l, HCl 6 ml/l) at 35° C. for two minutes and thereafter immersed in an activator solution (chlorauric acid 1 g/l, HCl 12 ml/l at 50° C. for three minutes.

Treatment for Adhering Fine Noble Metal Particles (3)

The base plate was immersed in a sencitizer solution ($SnCl_2$ 12 g/l, HCl 45 ml/l) at 45° C. for three minutes and thereafter immersed in an activator solution (silver nitrate 1.5 g/l, ammonia 1.2 ml/l) at 45° C. for two minutes.

Treatment for Adhering Fine Noble Metal Particles (4)

The base plate was immersed in a sencitizer solution ("Pink shoemer" manufactured by Nihon Kanizen Co. Ltd.) at 30° C. for two minutes and thereafter immersed in an activator solution ("Red Shoemer" manufactured by Nihon Kanizen Co. Ltd.) at 35° C. for two minutes.

Treatment for Adhering Fine Noble Metal Particles (5)

The base plate was immersed in a catalyzing solution ("D" Solution: a colloidal solution which was prepared by adding in order HCl 320 ml, water, $PdCl_2$ 1 g and $SnCl_2 \cdot 2H_2O$ 4 g, aging the obtained mixture for one day and thereafter adding $SnCl_2 \cdot 2H_2O$ 46 g) at 30° C. for 90 seconds and thereafter immersed in an acceleration solution ("K" Solution: $NH_4BF_4$ 1 mol/l) at 50° C. for two minutes.

Treatment for Adhering Fine Noble Metal Particles (6)

The base plate was immersed in a catalyzing solution ("F" Solution: a hydrochloric acid based colloidal solution "Cataposit 44" manufactured by Shiplay Far East Co. Ltd.) at 45° C. for one minute and thereafter immersed in an acceleration solution ("M" Solution: "Accelerator 19" by Shiplay Far East Co. Ltd.) at 35° C. for four minutes.

After the base plate was subjected to each of the above treatments for adhering fine noble metal particles, the base plate was coated with a nonmagnetic layer comprising a NiP plating film of 0.02 μm thick by using an electroless NiP plating solution ("Shoemer"), which was manufactured by Nihon Kanizen Co. Ltd., to form the magnetic disc member of the structure as shown in FIG. 1. The resulting magnetic disc members are referred to as magnetic disc members 1-6 which correspond to the treatments 1-6 for adhering the fine noble metal particles, respectively.

It was determined with an electron microscope (SEM and TEM) that at the surface of the obtained magnetic disc member, the microprotuberances of 0.02-0.03 μm in height were formed with a density of not less than one per 1.5 μm². The microprotuberances had a size of 0.03-0.05 μm and had a slightly slender and inverted hemispherical shape. The microprotuberances were uniform in the height, size and shape thereof and were uniformly and densely formed at the surface of the magnetic disc member.

EXAMPLE 2

An aluminum alloy base plate (100 mm of an inner diameter and 210 mm of an outer diameter) was subjected to a publicly-known pretreatment (washing, zinc-substituted treatment or the like). Thereafter the pretreated base plate was coated with a nonmagnetic NiP thick underlying film of 20 μm in thickness by using an electroless NiP plating solution ("Nipodit") which was manufactured by Shiplay Far East Co. Ltd. Then, the surface of the thick underlying film was subjected to a mirror-polishing to obtain good surface precision (Ra 0.0015 μm, TIR≦21 μm, acceleration of gravity≦1.8G). Thereafter, the surface was subjected to a conditioning treatment which was followed by a treatment for adhering fine noble metal particles to the treated surface under the following conditions.

Treatment for Adhering fine Noble Metal Particles (7)

The base plate was immersed in a sencitizer solution ($SnCl_2$ 6 g/l, HCl 30 ml/l) at 25° C. for two minutes and thereafter immersed in an activator solution ($PdCl_2$ 0.05 g/l, HCl 2 ml/l) at 40° C. for one minute.

Treatment for Adhering Fine Noble Metal Particles (8)

The base plate was immersed in a sencitizer solution ($SnCl_2$ 80 g/l, Rochelle salt 140 g/l, NaOH 100 g/l) for three minutes and thereafter immersed in an activator solution (chlorauric acid 1.5 g/l, HCl 2 ml/l) at 25° C. for 1.5 minutes.

Treatment for Adhering Fine Noble Metal Particles (9)

The base plate was immersed in a sencitizer solution ($SnCl_2$ 5 g/l, HCl 13 ml/l) at 40° C. for 30 seconds and thereafter immersed in an activator solution (silver nitrate 1 g/l, ammonia 2 ml/l) at 40° C. for two minutes.

Treatment for Adhering Fine Noble Metal Particles (10)

The base plate was immersed in a sencitizer solution ("Pink Shoemer" manufactured by Nihon Kanizen Co. Ltd.) at 30° C. for two minutes and thereafter immersed in an activator solution ("Red Shoemer" manufactured by Nihon Kanizen Co. Ltd.) at 35° C. for two minutes.

Treatment for Adhering Fine Noble Metal Particles (11)

The base plate was immersed in a catalyzing solution ("A" Solution: a colloidal solution which was prepared by adding in order HCl 60 ml, water, $PdCl_2$ 1 g and $SnCl_2 \cdot 2H_2O$ 2 g and then adding water to 1000 ml) for 90 seconds and thereafter immersed in an acceleration solution ("K" Solution: $NH_4BF_4$ 1 mol/l) at 45° C. for 90 seconds.

Treatment for Adhering Fine Noble Metal Particles (12)

The base plate was immersed in a catalyzing solution ("F" Solution: a hydrochloric acid based colloidal solution "Catposit 44" manufactured by Shiplay Far East Co. Ltd.) at 45° C. for 90 seconds and thereafter immersed in an acceleration solution ("M" Solution: "Accelerator 19" by Shiplay Far East Co. Ltd.) at 35° C. for two minutes.

Treatment for Adhering Fine Noble Metal Particles (13)

The base plate was immersed in an activator solution ($PdCl_2$ 0.04 g/l, HCl 8 ml/l) at 50° C. for three minutes.

Treatment for Adhering fine Noble Metal Particles (14)

The base plate was immersed in an activator solution (chlorauric acid 1.3 g/l, HCl 4 ml/l) at 55° C. for 1.5 minutes.

Treatment for Adhering Fine Noble Metal Particles (15)

The base plate was immersed in an activator solution (silver nitrate 1.1 g/l, ammonia 1.2 ml/l) at 45° C. for four minutes.

Treatment for Adhering Fine Noble Metal Particles (16)

The base plate was immersed in an activator solution (Activator 1 manufactured by Nihon Kanizen Co. Ltd.) at 50° C. for 30 seconds.

After the base plate was subjected to each of the above treatments for adhering fine noble metal particles, the base plate was coated with a nonmagnetic layer comprising a NiCuP plating film of 0.05 $\mu$m thick by using an electroless NiCuP plating solution ("Nicroy"), which was manufactured by Shiplay Far East Co. Ltd., to form the magnetic disc member of the structure as shown in FIG. 1. The resulting magnetic disc members are referred to as magnetic disc members 7-16 which correspond to the treatments 7-16 for adhering the fine noble metal particles, respectively.

It was determined with an electron microscope (SEM and TEM) that at the surface of the obtained magnetic disc member, the microprotuberances of 0.01-0.02 $\mu$m in height were formed with a density of not less than one per 0.9 $\mu$m$^2$. The microprotuberances had size of 0.02-0.04 $\mu$m and slightly slender and inverted hemispherical shape. The microprotuberances were uniform in the height, size and shape thereof and were uniformly and densely formed at the surface of the magnetic disc member.

EXAMPLE 3

A magnetic disc member was made in a manner similar to that of Example 2, except that in this example the nonmagnetic layer, which was formed after each of the treatments for adhering the fine noble metal particles, had a thickness of 0.15 $\mu$m. The magnetic disc member of the structure as shown in the FIGURE was formed. The resulting magnetic disc members are referred to as magnetic 17-26 which correspond to the treatments 7-16 for adhering the fine noble metal particles, respectively.

It was determined with an electron microscope (SEM and TEM) that at the surface of the obtained magnetic disc member, the microprotuberances of 0.03-0.04 $\mu$m in height were formed with a density of not less than one per 0.9 $\mu$m$^2$. The microprotuberances had a size of 0.05- 0.07 $\mu$m and slightly slender and inverted hermispherical shape. The microprotuberances were uniform in the height, size and shape thereof and were uniformly and densely formed at the surface of the magnetic disc member.

EXAMPLE 4

A magnetic disc member was made in a manner similar to that of Example 2, except that in this example the nonmagnetic layer, which was formed after each of the treatments for adhering the fine noble metal particles, had a thickness of 0.3 $\mu$m. The magnetic disc member of the structure as shown in the FIGURE was formed. The thus obtained magnetic disc members are referred to as magnetic disc members 27-36 which correspond to the treatments 7-16 for adhering the fine noble metal particles, respectively.

It was determined with an electron microscope (SEM and TEM) that at the surface of the obtained magnetic disc member, the microprotuberances of 0.06-0.08 $\mu$m in height were formed with a density of not less than one per 0.9 $\mu$m$^2$. The microprotuberances had size of 0.12-0.14 $\mu$m and was slightly slender and inverted hemispherical shape. The microprotuberances were uniform in the height, size and shape thereof and were uniformly and densely formed at the surface of the magnetic disc member.

As shown in Examples 2 to 4, the height and size of the microprotuberances could be varied by increasing the thickness of the nonmagnetic layer which was formed after the treatment of adhering the fine noble metal particles. The density and distribution of the microprotuberances depend on the adhered fine noble metal particles and almost did not change even if the thickness of the nonmagnetic layer was increased.

COMPARATIVE EXAMPLE 1

A magnetic disc member was made in a manner similar to that of Example 3, except that in this comparative example none of the treatments for adhering the fine noble metal particles to the mirror-polished surface of the thick underlying film was carried out. The thus obtained magnetic disc member is referred to as H1.

The observation of the surface of the obtained magnetic disc member and the determination of the surface roughness thereof, by an electron microscope, showed that the surface had no microprotuberances and was extremely smooth.

COMPARATIVE EXAMPLE 2

A magnetic disc member was made in a manner similar to that of Comparative Example 1, except that in this comparative example, the surface of the thick underlying film, which was subjected to the mirror-polishing treatment, was then abraded with several abrasive grains (Medipole N35, N13, N08 ... the particle diameter thereof is in turn 3.5 $\mu$m, 1.3 $\mu$m, 0.8 $\mu$m) to change the surface roughness. The resulting magnetic disc members are referred to as H2, H3 and H4 in turn.

The determination of the surface roughness of the obtained magnetic disc member by means of a surface roughness tester showed that the roughness increased according to the size of the abrasive grain. However, it was observed by an electron microscope (magnification of not less than 10,000) that abrasive textures which have size corresponding to each size of the abrasive grains were sparsely and disorderly put at the surface of the obtained magnetic disc member. Thus, grooves were formed therein but microprotuberances were not formed.

On the magnetic disc member obtained according to the above Examples and Comparative Examples, a magnetic thin film having a thickness of 0.08 $\mu$m was formed by an electroless plating process wherein the following plating bath (1) was used.

Plating Bath (1)

| Composition of Plating Bath: | |
|---|---|
| Cobalt sulfate | 0.07 mol/l |
| Nickel sulfate | 0.03 mol/l |
| Sodium hypophosphite | 0.23 mol/l |
| Sodium malonate | 0.2 mol/l |
| Sodium malate | 0.3 mol/l |
| Sodium succinate | 0.4 mol/l |
| Ammonium sulfate | 0.3 mol/l |
| Plating conditions: | |
| Bath temparature | 80° C. |
| pH of plating bath | 9.2 |
| (pH is adjusted by ammonia water at a room temperature.) | |
| Volume of plating solution | 100 l |

Then, a silicic acid monomer was spin-coated on the magnetic thin film, which was followed by baking it at 190° C. for 20 hrs., to form a protective thin film having a thickness of 0.08 μm which comprises mainly a silicic acid polymer, and further a lubricating layer comprising a liquid lubricant (perfluoroalkyl polyether) was formed thereon, to make a magnetic disc. The resulting magnetic discs are referred to as magnetic discs 1 to 27 and magnetic discs $H_1$ to $H_4$ which correspond to the number of the magnetic disc members, respectively.

Thereafter, with regard to these magnetic discs, an occurrence of magnetic head adsorption was examined by using a 3350 type Mn-Zn ferrite magnetic head. The magnetic head and each of the discs were set on a drive and a friction coefficient was determined before and after leaving to stand. With regard to the magnetic discs 1 to 27 in which the magnetic disc members according to the examples were used, the friction coefficient before leaving to stand was within a range of 0.18 to 0.29. The greater the height of the microprotuberance is and the greater the surface roughness is, the more the friction coefficient had a tendency to decrease. However, such small values as 0.18-0.26 were all of practically good ones. The friction coefficient after leaving to stand for 100 hrs. was within a range of 0.19-0.25.

With regard to the magnetic discs in which the magnetic disc members according to the examples were used, there was no problem on the head adsorption. With regard to the magnetic discs in which the magnetic disc members according to the comparative examples were used, the friction coefficient before leaving to stand was 0.95 in the magnetic disc $H_1$, 0.38 in the magnetic disc H2, 0.47 in the magnetic disc H3 and 0.71 in the magnetic disc H4.

In case of the magnetic disc H1 having the greatest friction coefficient, there was a problem on the head adsorption even before leaving to stand. The friction coefficient after leaving to stand for 100 hrs. was determined. All the magnetic discs H1 to H4 had an increased friction coefficient of not less than 1.0 and the head adsorption was caused. In addition, with regard to the magnetic discs in which the magnetic disc members according to the examples and comparative examples were used, a CSS (Contact Start Stop) test was carried out by using the 3350 type Mn-Zn ferrite magnetic head to determine the number of times of the CSS till a surface defect occurs. If this number of times is not less than 20,000, it is recognized that the disc possesses practically good durability. In the magnetic disc $H_1$ in which the magnetic disc member of the comparative example was used, the surface defect occured in hundreds time of CSS, and a head crash occured in 3,300 times of CSS in case of the magnetic disc H2, in 2,100 times of CSS in the magnetic disc H3 and in 1,500 times of CSS in the magnetic disc H4.

With regard to the magnetic discs 1 to 27 in which the magnetic disc members of the examples were used, the occurrence of the surface defect in the disc was not observed even after 100,000 times of CSS and the durability was improved. Moreover, with regard to the magnetic discs in which the magnetic disc members of the examples and comparative examples were used, the recording and reproducing characteristics were compared with each other. The magnetic disc H1, in which the magnetic disc member of the comparative example was used, gave good recording and reproducing characteristics because the mirror-polished disc member was used. This disc is regarded as a standard disc which is used as criterion.

With regard to the magnetic discs 1 to 27 in which the magnetic disc members of the examples were used, all the characteristics such as output value, modulation of output envelope, resolution, overwrite, S/N, peakshift and bit error showed values similar to those of the standard disc. An influence due to the formation of the microprotuberance at the magnetic disc member in the examples was not recognized. However, with regard to the magnetic discs H2 to H4 in which the magnetic disc members of comparative example 2 were used, wherein the greater surface roughness was given with rough abrasive grains, each of the values of the recording and reproducing characteristics was remarkably inferior as compared with the standard disc.

The greater the abrasive roughness is, the more the recording and reproducing characteristics had a tendency to become bad. Among the recording and reproducing characteristics, the modulation of output envelope, S/N and bit error deteriorated remarkably. With regard to the recording and reproducing characteristics in 20,000 BPI (Bit Per Inch) and 1,000 TPI (Track Per Inch), the standard disc had S/N of 34-35 dB and the bit error of not more than 10 per one. On the other hand, for example, the magnetic disc H2 and S/N of 22-23 dB and the bit error of 500-1,000 per one. These values were inferior to the standard disc.

The comparative examples do not set forth a texture processing wherein abrasive textures are formed approximately in a circumferential direction. In this case, however, the direction of the abrasive textures is only different from that in the comparative examples. An effect of the abrasive textures basically on the head adsorption, durability, recording and reproducing characteristics and the like was similar to those in the comparative examples. Namely, in the case that the roughness due to the abrasion processing was similar to that of the comparative examples, it is recognized that the characteristics were deteriorated to the degree similar to those of the comparative examples.

The examples set forth only the plating disc wherein the magnetic thin film was formed by the plating process and the protective film was formed with the silicic acid monomer by using the spincoating process. However, a metal sputtering disc and ferrite sputtering disc wherein the magnetic thin film was formed by the sputtering process and a disc wherein the protective film was formed with carbon or $SiO_2$ by sputtering were also examined in the same manner as the above. As a result, it was recognized that these discs had an effect of the present invention similar to that in the examples.

What is claimed is:

1. A process for manufacturing a substrate for a magnetic disc member, said process comprising the steps of:
   preparing a base plate;
   mixing particles of a noble metal contained in a noble metal salt solution,
   immersing said base plate in said noble metal salt solution in order to adhere said particles to said base plate, and
   forming a non-magnetic layer on said base plate to which said particles of noble metal adhere, a surface of said non-magnetic layer having a roughness determined by a thickness of said non-magnetic layer.

2. A process for manufacturing a substrate as claimed in claim 1 and an added step of immersing said base plate in a modifying solution before making said particles of noble metal adhere to said base plate.

3. A process for manufacturing a substrate as claimed in claim 1 wherein said modifying solution of said added step is a solution of stannous chloride.

4. A process for manufacturing a substrate as claimed in claim 1 wherein said solution of noble metal salt is a solution of chloraurate.

5. A process for manufacturing a substrate as claimed in claim 1 wherein said solution of noble metal salt is a solution of silver nitrate.

6. A process for manufacturing a substrate as claimed in claim 1 wherein said particles of a noble metal is selected from a group consisting of palladium, gold, silver, and platinum.

7. A process for manufacturing a substrate as claimed in claim 1 wherein the step of making said particles of noble metal adhere to said base plate is performed by a use of said noble metal salt solution at a temperature between 0° to 95° C.

8. A process for manufacturing a substrate as claimed in claim 1 wherein the step making said particles of noble metal adhere to said base plate is performed by immersing said base plate in said noble metal salt solution for a period of time having a duration between 1 second and 100 minutes.

* * * * *